United States Patent [19]
Bierly

[11] 3,771,021
[45] Nov. 6, 1973

[54] OVERCURRENT FOLDBACK CIRCUIT

[75] Inventor: Meade Goodman Bierly, Elizabethtown, Pa.

[73] Assignee: AMP Incorporated, Harrisburg, Pa.

[22] Filed: Aug. 2, 1972

[21] Appl. No.: 277,422

[52] U.S. Cl. ..................... 317/33 VR, 323/4, 323/9
[51] Int. Cl. ............................................. H02h 7/20
[58] Field of Search ................. 323/4, 9; 317/33 VR

[56] References Cited
UNITED STATES PATENTS

| | | | |
|---|---|---|---|
| 3,173,078 | 3/1965 | Farnsworth | 317/33 VR |
| 3,345,554 | 10/1967 | Lupoli | 317/33 VR |
| 3,432,726 | 3/1969 | Meyer et al. | 323/9 X |
| 3,582,713 | 6/1971 | Till | 317/33 VR |

Primary Examiner—James D. Trammell
Attorney—William J. Keating et al.

[57] ABSTRACT

The disclosure relates to an overcurrent foldback circuit for achieving overload and short circuit protection for linear voltage regulator circuits wherein an overcurrent to a load is sensed in a differential amplifier and causes current to be drawn in one side of the differential amplifier. thereby decreasing the reference voltage at the other end of the differential amplifier due to a decrease in the output voltage. This causes even greater current conduction in the differential amplifier and provides regenerative foldback. This is accomplished with small power loss in a current sensing resistor and allows accurate setting of the overcurrent point over a wide temperature range and over a wide input voltage variations.

8 Claims, 1 Drawing Figure

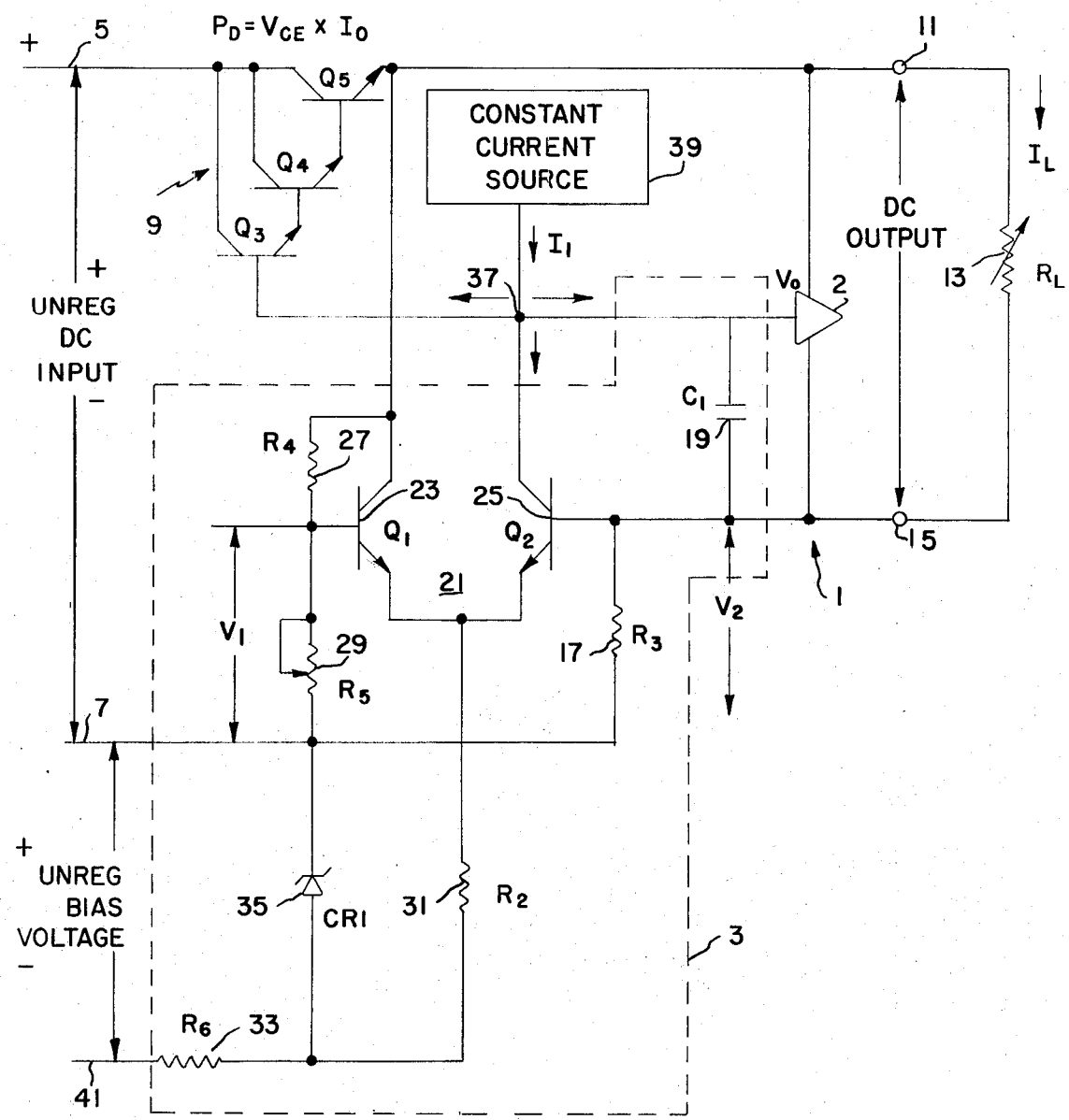

OVERCURRENT FOLDBACK CIRCUIT

The disclosure relates to an overcurrent foldback circuit and, more specifically, to a circuit for detecting excess current in an output load and regeneratively decreasing the output voltage thereby.

Overcurrent foldback protective circuits for use in power supplies and specifically in regulated power supplies are well known. Circuits of this type are designed to sense overcurrent and, in response thereto, cut the current in the circuit back to a minimal value, theoretically to zero, in order to protect the load circuit. However, it is always desirable to provide regulated power supplies wherein overcurrent sensing circuits require a minimal amount of power and wherein an accurate setting of the overcurrent point is available over a wide range of temperatures and a wide range of input voltages.

In accordance with the present invention, there is provided an overcurrent foldback circuit for use in a series regulated power supply, wherein there is provided an accurate setting of the overcurrent point over a wide temperature range and over wide input voltage variations. Briefly, the above is provided by utilizing a differential amplifier, one side of which is coupled to a reference voltage and the other side being coupled to a voltage developed by the load current. An increase of the load current above a predetermined level set by the reference voltage will cause the differential amplifier to conduct and thereby draw current away from a series pass element, thereby allowing less current to pass through the series pass element and decreasing the output voltage of the regulator. This decrease in output voltage will decrease the reference voltage and cause the differential amplifier to conduct even more current. The effect is regenerative and causes a rapid foldback.

It is therefore an object of this invention to provide an overcurrent foldback circuit for a series regulator having small power loss in the current sensing resistor.

It is a further object of this invention to provide an overcurrent foldback circuit for a regulator which allows accurate setting of the overcurrent point over a wide temperature range and over a wide input voltage variations.

The above objects and still further objects of the invention will immediately become apparent to those skilled in the art after consideration of the following preferred embodiment thereof which is provided by way of example and not by way of limitation, wherein:

The FIGURE is a circuit diagram of a preferred embodiment of a series regulator including the overcurrent foldback circuit in accordance with the present invention.

Referring now to The FIGURE, there is shown a series regulator 1 having a foldback circuit 3 as a portion thereof. The regulator has an unregulated DC input between the loads 5 and 7 thereof, the input being applied to a series pass element 9 composed of transistors Q3, Q4 and Q5, each having a common collector, the emitter of Q3 being connected to the base of Q4 and the emitter of Q4 being connected to the base of Q5. The emitter of Q5 is coupled to an output terminal 11 which is coupled to a load 13 shown as a variable resistor $R_1$. The normal DC output voltage is taken across the terminals 11 and 15, which terminals are coupled across the load 13.

The load current $I_L$ passes through a resistor 17, on its return to terminal 7, the voltage across resistor 17 being denoted as $V_2$. Resistor 17 is of low value so that the voltage drop thereacross is low (i.e. 0.1 volt) and doesn't consume much power under normal conditions. Resistor 17 as well as capacitor 19 and differential amplifier 21, composed of transistors 23 and 25, resistor 27, variable resistor 29, resistors 31 and 33 and zener diode 35 compose the foldback circuit 3 in accordance with the present invention. The voltage $V_2$ is applied to the base of the transistor 25 whereas a voltage $V_1$, developed across the variable resistor 29 of a voltage divider circuit composed of resistors 27 and 29, is the reference voltage applied to the base of transistor 23.

A conventional voltage regulator circuit 2 is coupled between terminals 11 and 15 and the positive side of capacitor 19. Regulator circuit 2 can take the form of an operational amplifier and is so shown in the FIGURE. A constant current source 39 feeds current $I_1$ to the junction 37 from which the current breaks up into three current paths, as will be explained in detail hereinbelow.

As long as there is no overcurrent in the load 13, transistor 25 will not conduct. Meanwhile, the capacitor 19 will be charged to a predetermined voltage by the constant current source 39, which normally sends current to pass element 9 and regulator circuit 2 but not to circuit 3. This causes the base of transistor Q3 of the series pass element 9 to have the predetermined voltage thereon and causes the series pass element to conduct in normal manner. When there is an overload and the load current $I_L$ increases beyond a predetermined level, as determined by the value of the voltage $V_1$ across the resistor 29, the differential amplifier 21 will be unbalanced in that the voltage $V_2$ across resistor 17 will be greater than the voltage $V_1$, thereby causing transistor 25 of the differential pair 21 to conduct. The conduction of the transistor 25 causes current from the constant current source 39 to be diverted away from the transistor Q3 and toward the collector of transistor 25, thereby causing the series pass element 9 to conduct less current and cause a decrease in the output current and voltage across the terminals 11 and 15. This also causes a decreased current to be applied to the voltage divider composed of resistors 27 and 29, thereby causing a decrease in the reference voltage $V_1$ and causing a greater imbalance in the differential amplifier 21. It can be seen that this is a regenerative condition and thereby quickly causes a decrease in the current through the load 13, increased current passing to transistor 25 and less current to the series pass element. In this way the current to the load is quickly decreased to a minimal value.

A negative bias voltage is provided, which is regulated and independent of line voltage variations, by means of an unregulated bias voltage applied across the terminals 7 and 41. Regulation is provided by the zener diode 35.

It can be seen that there is provided an overcurrent foldback circuit which is simple and inexpensive to provide as well as providing small power loss in a current sensing resistor 17 and allowing accurate setting of the overcurrent point via the resistor 29 and capable of operation over a wide temperature range.

Though the invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. A foldback circuit for sensing overcurrent in a load fed by a voltage regulated current supply which comprises:
   a differential amplifier having a pair of current conducting devices, each having an input,
   reference voltage means coupled to one of said inputs, said reference voltage means being responsive to the voltage across said load,
   overcurrent sensing means coupled to the other of said inputs and responsive to current through said load,
   a constant current source supplying current to said one of said current conducting devices coupled to said overcurrent sensing means,
   said current conducting devices each having a commonly coupled electron emitting electrodes,
   a regulated voltage source coupled to said commonly coupled electrodes, and
   current pass means having an output and control electrode and responsive to predetermined operation of said differential amplifier for controlling the current to said load.

2. A foldback circuit as set forth in claim 1 wherein said overcurrent sensing means is a resistor in series with said load and a reference potential.

3. A foldback circuit as set forth in claim 1 wherein said reference voltage means includes a voltage divider connected between the output of said current pass means and said reference potential.

4. A foldback circuit as set forth in claim 2 wherein said reference voltage means includes a voltage divider connected between the output of said current pass means and said reference potential.

5. A foldback circuit as set forth in claim 1 wherein said differential amplifier includes a pair of semiconductor devices, each having a current collecting electrode, a current emitting electrode and a control electrode and a constant current source coupled to the electron collecting electrode of one of said semiconductor devices and to said control electrode of said current pass means.

6. A foldback circuit as set forth in claim 2 wherein said differential amplifier includes a pair of semiconductor devices, each having a current collecting electrode, a current emitting electrode and a control electrode and a constant current source coupled to the electron collecting electrode of one of said semiconductor devices and to said control electrode of said current pass means.

7. A foldback circuit as set forth in claim 3 wherein said differential amplifier includes a pair of semiconductor devices, each having a current collecting electrode, a current emitting electrode and a control electrode and a constant current source coupled to the electron collecting electrode of one of said semiconductor devices and to said control electrode of said current pass means.

8. A foldback circuit as set forth in claim 4 wherein said differential amplifier includes a pair of semiconductor devices, each having a current collecting electrode, a current emitting electrode and a control electrode and a constant current source coupled to the electron collecting electrode of one of said semiconductor devices and to said control electrode of said current pass means.

* * * * *